UNITED STATES PATENT OFFICE.

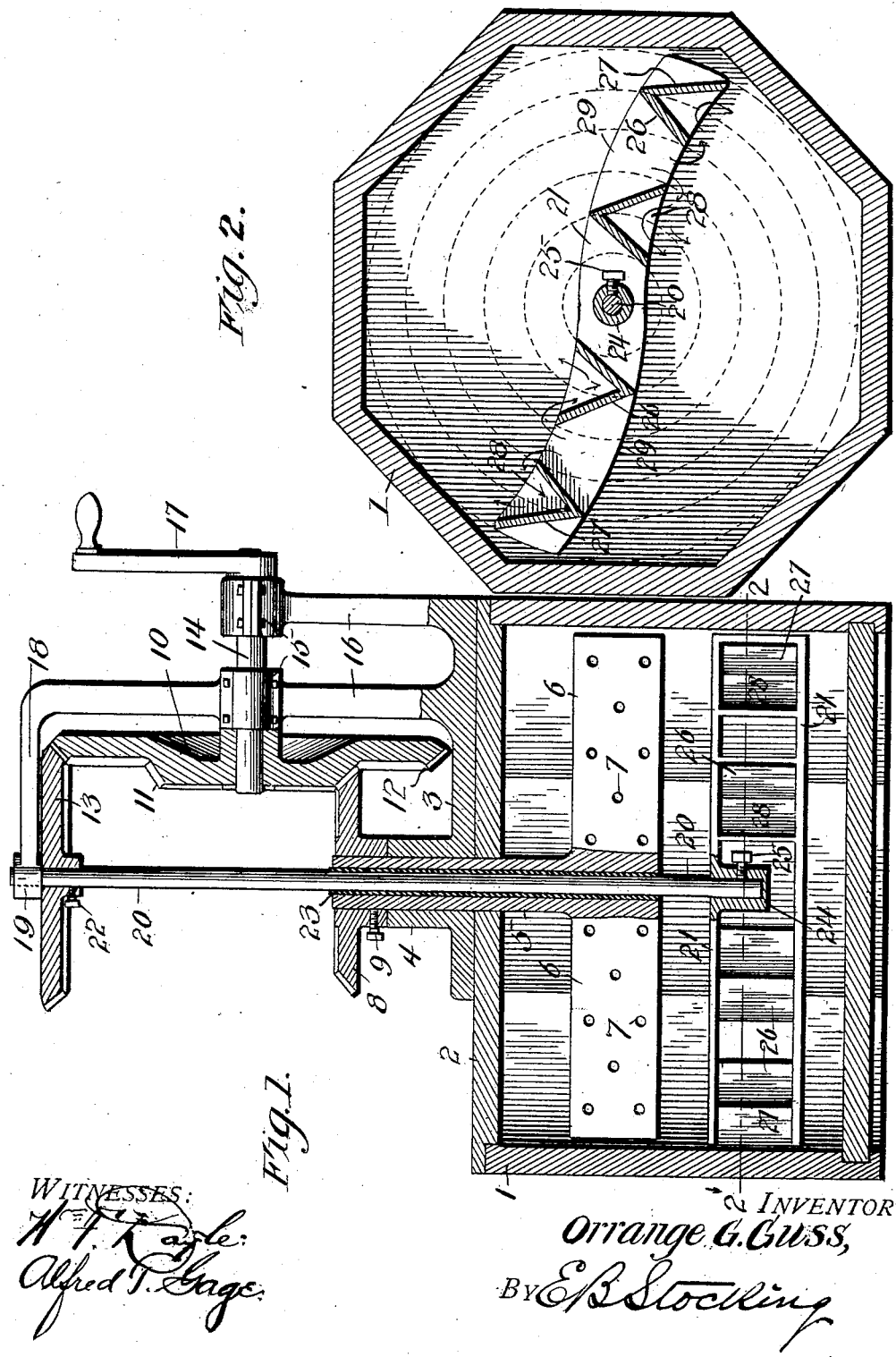

ORRANGE G. GUSS, OF DELPHOS, OHIO, ASSIGNOR TO CHICKASAW MANUFACTURING COMPANY, OF CHICKASAW, OHIO, A CORPORATION OF OHIO.

CHURN.

No. 863,713.  Specification of Letters Patent.  Patented Aug. 20, 1907.

Application filed April 8, 1907. Serial No. 366,973.

*To all whom it may concern:*

Be it known that I, ORRANGE G. GUSS, a citizen of the United States, residing at Delphos, county of Van Wert, and State of Ohio, have invented certain new and useful Improvements in Churns, of which the following is a specification, reference being had therein to the accompanying drawing.

This invention relates to a churn, and particularly to the dasher construction thereof.
The invention has for an object to provide an improved construction of the dasher mechanism of the churn involving a breaker dasher provided with staves formed of walls disposed at an angle to each other so as to form an open V-shaped structure, these staves being disposed upon an oppositely curved dasher so as to travel in concentric paths, those upon one side of the axis of the dasher being disposed intermediate of the staves upon the opposite side.

Other and further objects and advantages of the invention will be hereinafter set forth and the novel features thereof defined by the appended claims.

In the drawing:—Figure 1 is a vertical section through the churn; and Fig. 2 is a horizontal section on the line 2,—2, Fig. 1.
Like numerals refer to like parts in the several views of the drawing.

The numeral 1 designates the churn body which may be of any desired construction, but preferably having angularly disposed walls, for instance, octagon in shape, as shown in Fig. 2. This body is provided with a cover 2 upon which the driving mechanism for the churn dasher is mounted. This mechanism may be of any desired character, for instance, as shown in Fig. 1, where the bed plate 3 is provided with a central bearing 4 for the tubular shaft 5 of the collecting dasher 6 which is of usual construction and comprises blades provided with apertures 7 therein. This dasher is adjustably supported from its driving gear 8 by any desired means, for instance, a set screw 9 so that it may be elevated or depressed within the body depending upon the amount of liquid therein to be churned. The gear 8 rests upon the upper surface of the bearing 4 and is driven by the driving gear 10 which is provided with an inner set of bevel teeth 11 to mesh with the gear 8, and an outer bevel gear 12 to mesh with the driving gear 13 for the breaker dasher. The driving gear 10 is secured upon the shaft 14 which is mounted in bearings 15 carried upon the standards 16 and provided with the operating handle 17. The upper portion of one of the bearings 16 is extended at an angle over the top of the churn, as shown at 18 and formed with a vertically disposed bearing 19 for the upper end of the driving shaft 20 which extends downward to the breaker dasher 21. The gear 13 is secured upon its shaft by means of the set screw 22 or any suitable device. The shaft 20 extends through the tubular shaft 5 and is separated therefrom by a bearing sleeve 23 preferably formed of fiber or similar material in order to prevent the grinding of the metal surfaces of the bearing shafts against each other which in practical use produces a discoloration of the liquid in the churn, and friction which prevents the easy operation of the parts.

The breaker dasher 21 is adjustably secured to the lower portion of the shaft 20 by means of the socket 24 carried by the dasher and provided with a set screw 25 engaging the shaft. The breaker is composed of the top and bottom plates between which a series of vertically disposed blades 26 are located at an angle to each other to form substantially V-shaped staves with their apexes disposed in the direction of rotation, while the diverging ends of said blades will leave an open space 28 at the back of the staves into which the liquid passing between the staves is drawn to assist in breaking up the cream cells thereof. These staves are disposed to travel in concentric lines as indicated by dotted lines in Fig. 2, and those at one side of the axis of the dasher are disposed to travel in lines intermediate of the staves upon the opposite side and concentric thereto. The plates of the dasher are disposed in opposite curved lines 29 forming a compound curve thus locating the apex of one of the staves on each side in advance of the other and causing the stave removed from the axis to have one wall 27 of greater length than the opposite wall 26 thereof thus producing a whirling and compressing action of the liquid in the churn throwing or forcing the liquid at the ends of the dasher against the angular walls of the body.

In the operation of the churn, the V-shaped staves force the liquid to pass through the contracted space between the walls of adjacent stave and after its passage therethrough it is drawn or ebbs back into the recess at the diverging ends of the staves thus assisting in breaking up the cream cells by the violent contraction of the liquid and its expansion into the recesses in the staves where it is practically in a state of rest which permits the separation of the cream from the broken cells. The curved form of the dasher presents the apexes of the staves one in advance of the other, while the disposition of these staves upon the dasher provides for their action upon every part of the liquid and the extended wall of the outer stave coöperates with the angular wall of the casing to form a similar compressed area of liquid as that occurring between the adjacent staves and this materially reduces the time in the churning action and facilitates the production of the maximum amount of butter from the liquid.

Both the breaker dasher and the collecting dasher are adjustable upon their shafts to the desired extent to accommodate the contents of the churn, while the fiber bearing sleeve between the shafts of these dashers prevents the contact of the metal parts with each other and the consequent discolorization of the liquid by the grinding out of the metal bearings which occurs very rapidly owing to the oily character of the contents of the churn.

It will be seen that the open V-shaped staves cut their way through the contents of the churn compressing the liquid in the passage between each stave and the body which produces a concussion to break up the cells of the butter cream and is then forced into the recesses within the staves and permits the separation and rising of any butter formed until it reaches the field of action of the collecting dasher which operates in the usual manner thereon.

Having described my invention and set forth its merits, what I claim and desire to secure by Letters Patent is:—

1. In a churn, a body having angularly disposed walls, and a rotary breaker therein provided with substantially V-shaped staves closed at their apex and having a recess at the rear, those upon one side of the axis of the breaker being disposed to travel in an intermediate concentric path to those on the opposite side.

2. In a churn, a body, a rotary breaker therein, and blades upon said breaker comprising diverging walls forming substantially V-shaped staves closed at their apex and having recesses at their rear.

3. In a churn, a body, a rotary breaker therein, and blades upon said breaker comprising diverging walls forming a substantially V-shaped stave with a recess at its rear, said breaker being curved in opposite directions at each side of its pivot to dispose the apex of one of said staves in advance of the other.

4. In a churn, a body portion, a breaker dasher, a collecting dasher having a tubular shaft surrounding the breaker dasher shaft, an interposed tubular fiber packing between the breaker and collecting shafts, and means for rotating said shafts in opposite directions.

5. In a churn, a body portion, a breaker dasher, a collecting dasher having a tubular shaft surrounding the breaker dasher shaft, an interposed tubular fiber packing between the breaker and collecting shafts, means for rotating said shafts in opposite directions, and means for adjusting the shaft of the breaker vertically relative to the bottom of the churn.

6. In a churn, a body, a rotary breaker dasher comprising opposite plates having interposed diverging walls comprising V-shaped staves closed at their apex and open at their rear, and means for rotating said dasher.

7. In a churn, a body, a rotary breaker dasher comprising opposite plates having interposed walls comprising V-shaped staves open at their rear and spaced from each other, a driving shaft for rotating said dasher, and a socket carried by the upper plate of the dasher and provided with means to engage the lower end of said shaft.

8. In a churn, an octagonal body, a breaker dasher curved in opposite directions at each side of its axis, a driving shaft for said dasher, and diverging blades forming V-shaped staves upon said dasher and having recesses at their rear.

9. In a churn, an octagonal body, a breaker dasher curved in opposite directions at each side of its axis, a driving shaft for said dasher, diverging blades forming V-shaped staves upon said dasher and having recesses at their rear, a collecting dasher having a tubular shaft surrounding the shaft of the breaker and provided with perforated blades, and means for rotating said collecting dasher in an opposite direction to the breaker.

10. In a churn, an octagonal body, a breaker dasher curved in opposite directions at each side of its axis, a driving shaft for said dasher, and diverging blades forming V-shaped staves upon said dasher and having recesses at their rear, the outer wall of the stave next to the churn body being of greater length than the inner wall thereof.

In testimony whereof I affix my signature in presence of two witnesses.

ORRANGE G. GUSS.

Witnesses:
 JOHN F. KRIEFT,
 L. P. JACKSON.